US012689837B2

(12) United States Patent
Nakamura et al.

(10) Patent No.: US 12,689,837 B2
(45) Date of Patent: Jul. 21, 2026

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventors: Hinako Nakamura, Kanagawa (JP); Nobukazu Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 18/524,793

(22) Filed: Nov. 30, 2023

(65) Prior Publication Data

US 2024/0196108 A1     Jun. 13, 2024

(30) Foreign Application Priority Data

Dec. 9, 2022    (JP) ................................. 2022-197082

(51) Int. Cl.
| | |
|---|---|
| *H04N 23/958* | (2023.01) |
| *G06T 5/50* | (2006.01) |
| *H04N 23/61* | (2023.01) |
| *H04N 23/80* | (2023.01) |

(52) U.S. Cl.
CPC ............. *H04N 23/958* (2023.01); *G06T 5/50* (2013.01); *H04N 23/61* (2023.01); *H04N 23/80* (2023.01); *G06T 2207/10148* (2013.01); *G06T 2207/20221* (2013.01)

(58) Field of Classification Search
CPC .................................................. H04N 23/958
See application file for complete search history.

(56) References Cited

U.S. PATENT DOCUMENTS

| | | | | |
|---|---|---|---|---|
| 10,395,348 | B2 * | 8/2019 | Kawai ..................... | H04N 23/67 |
| 2016/0234426 | A1 * | 8/2016 | Nakagawa ........... | H04N 23/673 |
| 2019/0132528 | A1 * | 5/2019 | Nashizawa ............... | G06T 7/32 |
| 2019/0139239 | A1 * | 5/2019 | Yasutomi ............. | H04N 23/676 |

FOREIGN PATENT DOCUMENTS

| | | | | |
|---|---|---|---|---|
| JP | 2016-039613 A | | 3/2016 | |
| JP | 2023063114 A | * | 5/2023 | |
| KR | 20180008221 A | * | 1/2018 | ........... H04N 13/106 |

OTHER PUBLICATIONS

English translation of KR-20180008221-A, Jakubiak, 2018 (Year: 2018).*
English translation of JP-2023063114-A, Hisamoto, 2023 (Year: 2023).*

* cited by examiner

*Primary Examiner* — James M Hannett
(74) *Attorney, Agent, or Firm* — Cowan, Liebowitz & Latman, P.C.

(57) ABSTRACT

An image processing apparatus acquires lens information, combines a plurality of images with different focus positions based on information about an imaging magnification acquired from the lens information to generate a combined image with a depth of field deeper than that of each of the plurality of images, and detects a main object. In a case where the processor has not detected the main object, the processor is configured to combine the plurality of images based on the information about the imaging magnification.

21 Claims, 5 Drawing Sheets

OUTDOOR
502 501
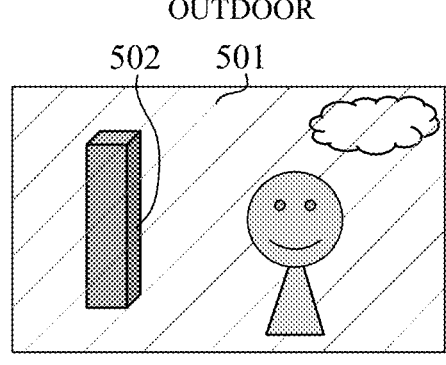
INDOOR
503
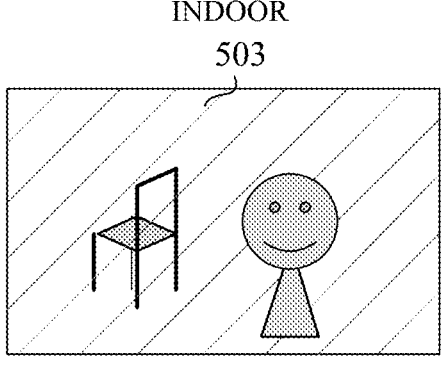
FIG. 5A
FIG. 5B

IMAGE PROCESSING APPARATUS, IMAGE PICKUP APPARATUS, IMAGE PROCESSING METHOD, AND STORAGE MEDIUM

BACKGROUND

Technical Field

One of the aspects of the embodiments relates to an image processing apparatus, an image pickup apparatus, an image processing method, and a storage medium.

Description of Related Art

A so-called depth combination technology is known that captures a plurality of images with different focus positions in the optical axis direction (focus bracket imaging), extracts an in-focus area of each image, and combines an image with an expanded depth of field. A proper depth of field is to be set in order to generate a depth combined image intended by the user. Japanese Patent Laid-Open No. 2016-39613 discloses a method for generating a combined image based on distance information in an arbitrary range specified by a user on a screen (image).

The method disclosed in Japanese Patent Laid-Open No. 2016-39613 cannot perform settings relating to the depth combination, such as a depth combination range, without the user operation.

SUMMARY

An image processing apparatus according to one aspect of the embodiment includes a memory storing instructions, and a processor configured to execute the instructions to acquire lens information, combine a plurality of images with different focus positions based on information about an imaging magnification acquired from the lens information to generate a combined image with a depth of field deeper than that of each of the plurality of images, and detect a main object. In a case where the processor has not detected the main object, the processor is configured to combine the plurality of images based on the information about the imaging magnification.

An image processing apparatus according to another aspect of the embodiment includes a memory storing instructions, and a processor configured to execute the instructions to acquire lens information, combine a plurality of images with different focus positions based on information about an imaging magnification acquired from the lens information to generate a combined image with a depth of field deeper than that of each of the plurality of images, and determine whether there is a moving object. In a case where the processor has determined that there is the moving object, the processor does not combine the plurality of images.

An image pickup apparatus having one of the above image processing apparatuses also constitutes another aspect of the embodiment. An image processing method corresponding to each of the above image processing apparatuses also constitutes another aspect of the embodiment. A storage medium storing a program that causes a computer to execute the above image processing method also constitutes another aspect of the embodiment.

Further features of the disclosure will become apparent from the following description of embodiments with reference to the attached drawings.

BRIEF DESCRIPTION OF THE DRAWINGS

FIGS. 5A and 5B explain an example of background area detection in the first embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
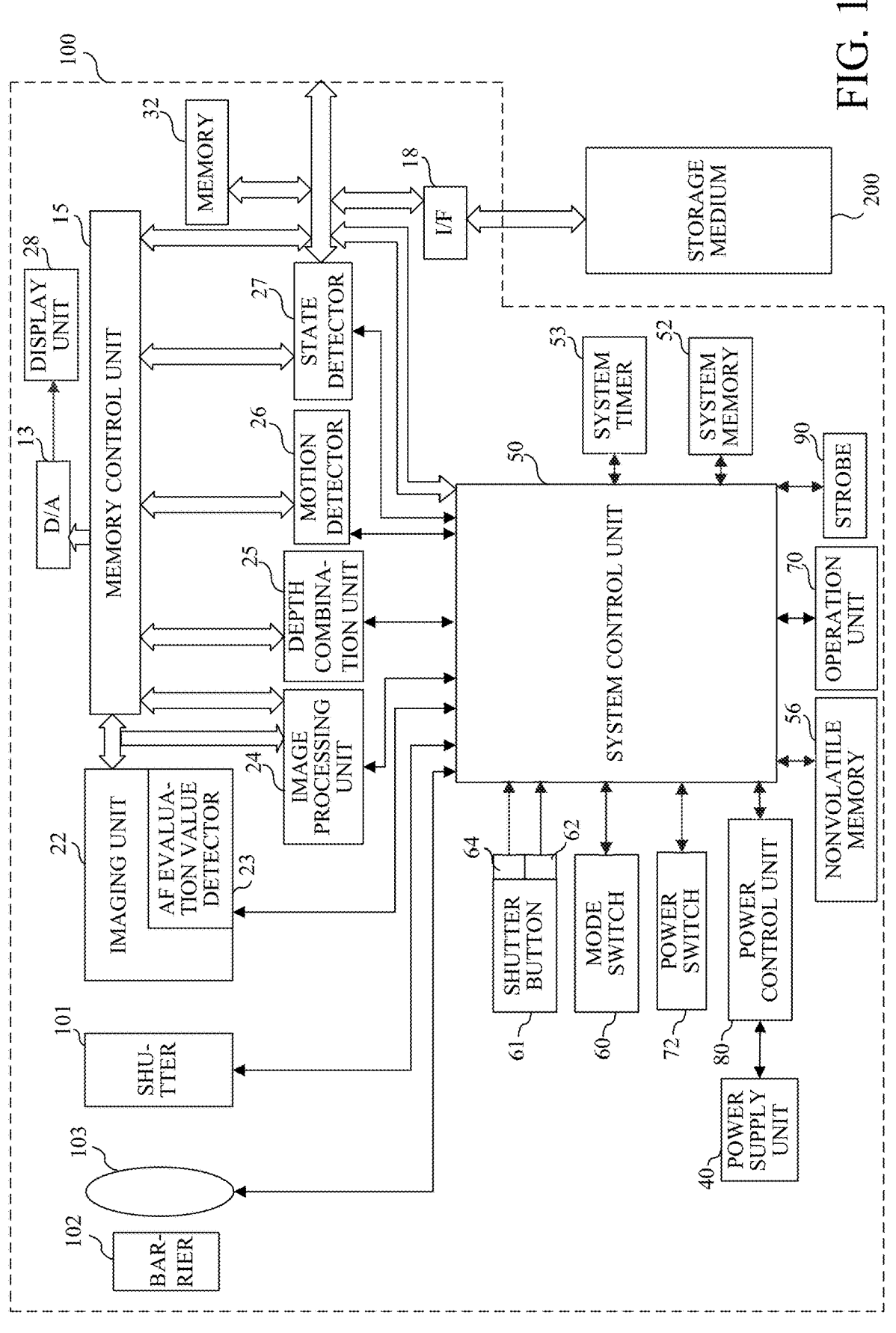
FIG. 1 is a block diagram of an image pickup apparatus according to each embodiment.

Referring now to FIG. 1, a description will be given of an image pickup apparatus (image processing apparatus) 100 according to a first embodiment. FIG. 1 is a block diagram of the image pickup apparatus 100. In this embodiment, the image pickup apparatus 100 is a digital camera, but is not limited to this example, and may be any other apparatus having an image sensor and capable of acquiring an image, such as a portable apparatus or a network camera.

The image pickup apparatus 100 includes an imaging system including a shutter 101, a barrier 102, a focus lens 103, and an imaging unit 22. In the image pickup apparatus 100, the camera body and the lens apparatus may be integrated, or the lens apparatus may be attachable to and detachable from the camera body.

The shutter 101 is a shutter with an aperture function. The barrier 102 covers the imaging system of the image pickup apparatus 100 to prevent the imaging system from getting dirty or damaged. The focus lens 103 is a lens included in an unillustrated lens unit disposed between the shutter 101 and the barrier 102. The lens unit described above also includes another lens such as a zoom lens. The imaging unit 22 includes the image sensor, such as a CCD or CMOS device, that converts an optical image into an electrical signal, and an A/D conversion processing function. The output data (captured image) of the imaging unit 22 is directly written into a memory 32 via an image processing unit 24 and a memory control unit 15 or via the memory control unit 15. In focus bracket imaging, which will be described below, all of the set number of captured images are written into the memory 32.

The image pickup apparatus 100 further includes an autofocus (AF) evaluation value detector 23, a strobe 90, the image processing unit 24, a depth combination unit 25, a motion detector (moving object determining unit) 26, a state detector 27, the memory 32, a D/A converter 13, and a display unit 28. The image pickup apparatus 100 further includes a nonvolatile memory 56, a system control unit 50, a system memory 52, and a system timer 53. The AF evaluation value detector 23 is provided inside the imaging unit 22, calculates an AF evaluation value from contrast information etc. obtained from a digital image signal, and transmits the obtained AF evaluation value from the imaging unit 22 to the system control unit 50. By emitting light during imaging, the strobe 90 can supplement illuminance during imaging in low-illuminance scenes or backlit scenes.

The image processing unit 24 performs predetermined pixel interpolation, resizing processing such as reduction, and color conversion processing for the image data output from the imaging unit 22 or the image data from the memory control unit 15. The image processing unit 24 also performs predetermined calculation processing using the captured image data. The system control unit 50 performs exposure control and focus detecting control based on the obtained calculation results. Thereby, the through-the-lens (TTL) type auto-exposure (AE) processing and automatic electronic flash (EF) processing are performed. The image processing unit 24 also performs AF processing. At this time, the output of the AF evaluation value detector 23 provided in the imaging unit 22 may be used. The image processing unit 24 performs predetermined calculation processing using the captured image data and performs TTL-based auto white balance (AWB) processing based on the obtained calculation result.

The depth combination unit 25 generates an image in which a depth of field is expanded by outputting in-focus pixels in each image using a plurality of captured images obtained by focus bracketing imaging in the imaging unit 22. The details will be described below.

Using two image data, the motion detector 26 performs template matching processing for a target area and its surroundings, and calculates a motion vector for each of a plurality of divided areas in each image or for each pixel. In a case where the calculated motion vector is equal to or larger than a threshold, the motion detector 26 determines that there is movement in an object (there is a moving object), and notifies the system control unit 50 of the result. The state detector 27 detects the state of the image pickup apparatus 100, such as the angular velocity by a gyro sensor, the attachment and detachment state of a tripod, and the settings made by the user via the operation unit 70. The state detector 27 notifies the system control unit 50 of the detected result.

The memory 32 stores image data acquired and A/D converted by the imaging unit 22 and image data to be displayed on the display unit 28. The memory 32 has a storage capacity sufficient to store a predetermined number of still images, a predetermined period of a moving image, and audio. The memory 32 also serves as an image display memory (video memory). The D/A converter 13 converts the image display data stored in the memory 32 into an analog signal and supplies it to the display unit 28. Thereby, the display image data written in the memory 32 is displayed on the display unit 28 via the D/A converter 13. The display unit 28 performs display according to the analog signal from the D/A converter 13 on a display such as an LCD. A digital signal once A/D converted by the imaging unit 22 and stored in the memory 32 is analog-converted in the D/A converter 13, and sequentially transferred to the display unit 28 for display. Thereby, an electronic viewfinder function is realized. A through-image (live-view image) can be displayed.

The nonvolatile memory 56 is an electrically erasable/recordable memory, such as a flash memory. The nonvolatile memory 56 stores constants, programs, etc. for the operation of the system control unit 50. The program here includes, for example, a program for executing various flowcharts described below.

The system control unit 50 controls the entire image pickup apparatus 100. More specifically, the system control unit 50 implements focus bracketing imaging based on object information, object distance, and image contrast information by executing the program recorded in the non-volatile memory 56 described above. That is, the system control unit 50 sequentially captures a plurality of images with different focus positions by controlling driving of the focus lens 103 and the shutter 101 during imaging. A focus position changing amount (focus step) between adjacent captured images obtained by the imaging processing is set from a value calculated by the system control unit 50.

The system memory 52 includes a RAM, etc., and loads constants and variables for the operation of the system control unit 50, a program read out of the nonvolatile memory 56, and the like. The system control unit 50 performs display control by controlling the memory 32, the D/A converter 13, the display unit 28, and the like. The system timer 53 is a timer that measures the time for various controls or the time of a built-in clock.

The image pickup apparatus 100 further includes an operation unit for inputting various operation commands to the system control unit 50, and the operation unit includes a mode switch 60, a shutter button 61, a first shutter switch 64, a second shutter switch 62, an operation unit 70, and a power switch 72. The mode switch 60 switches the operation mode of the system control unit 50 to one of a still image recording mode, a moving image recording mode, a playback mode, and the like. The still image recording mode includes an automatic imaging mode, an automatic scene determining mode, a manual mode, various scene modes that make imaging settings for each imaging scene, a program AE mode, a custom mode, and the like. The mode switch 60 directly switches to any of these modes included in the still image capturing mode. Alternatively, after the mode switch 60 once switches to the still image capturing mode, the mode may be switched to any of these modes included in the still image capturing mode using another operating member. Similarly, the moving image capturing mode may also include a plurality of modes.

The shutter button 61 is an operation unit for issuing an imaging instruction. The first shutter switch 64 is turned on in a case where the shutter button 61 is half-pressed, and generates a first shutter switch signal SW1. The first shutter switch signal SW1 starts operations such as AF processing, AE processing, AWB processing, and EF processing. That is, parameters for imaging are acquired under the control of the system control unit 50. The user can select center single-point AF processing or face AF processing as the AF processing that is started upon receiving the first shutter switch signal SW1. Here, the center single-point AF processing is processing that performs AF for a single point at the center of the imaging screen, and the face AF processing is processing that performs AF for a face within the imaging screen detected by the face detection function. The second shutter switch 62 is turned on in a case where the operation of the shutter button 61 is completed, or the shutter button 61 is fully pressed (imaging instruction), and generates a second shutter switch signal SW2. The system control unit 50 starts a series of imaging processing operations from reading out signals from the imaging unit 22 to writing image data to a recording medium 200 in response to the second shutter switch signal SW2.

Each operation member of the operation unit 70 is assigned a proper function for each scene by selecting and operating various function icons displayed on the display unit 28, and acts as various function buttons. Examples of the function buttons include an end button, a return button, an image forwarding button, a jump button, a narrowing down button, and an attribute changing button. For example, in a case where the menu button is pressed, various setting menu screens are displayed on the display unit 28. The user can intuitively perform various settings using the menu screen displayed on the display unit 28, four-way buttons (up, down, left, right), and a SET button. The power switch 72 turns on and off the image pickup apparatus 100.

The image pickup apparatus 100 includes a power control unit 80, a power supply unit 40, and a recording medium interface (I/F) 18. The power control unit 80 includes a battery detecting circuit, a DC-DC converter, a switching circuit for switching the block to be energized, and the like, and detects whether or not a battery is attached, the type of battery, and the remaining battery level. The power control unit 80 controls the DC-DC converter based on the detection result and the instruction from the system control unit 50, and supplies the necessary voltage to each component including the recording medium 200 for a necessary period. The power supply unit 40 includes a primary battery such as an alkaline battery or a lithium battery, a secondary battery such as a NiCd battery, a NiMH battery, or a Li battery, an AC adapter, or the like. The recording medium I/F 18 is an interface with a recording medium 200 such as a memory card or a hard disk drive. The recording medium 200 is a recording medium such as a memory card for recording captured images, and includes a semiconductor memory, a magnetic disk, or the like.

Focus bracket imaging refers to imaging for moving the focus lens 103 to a desired focus position, and then performing exposure and readout of the imaging unit 22.

Figures 2, 3:
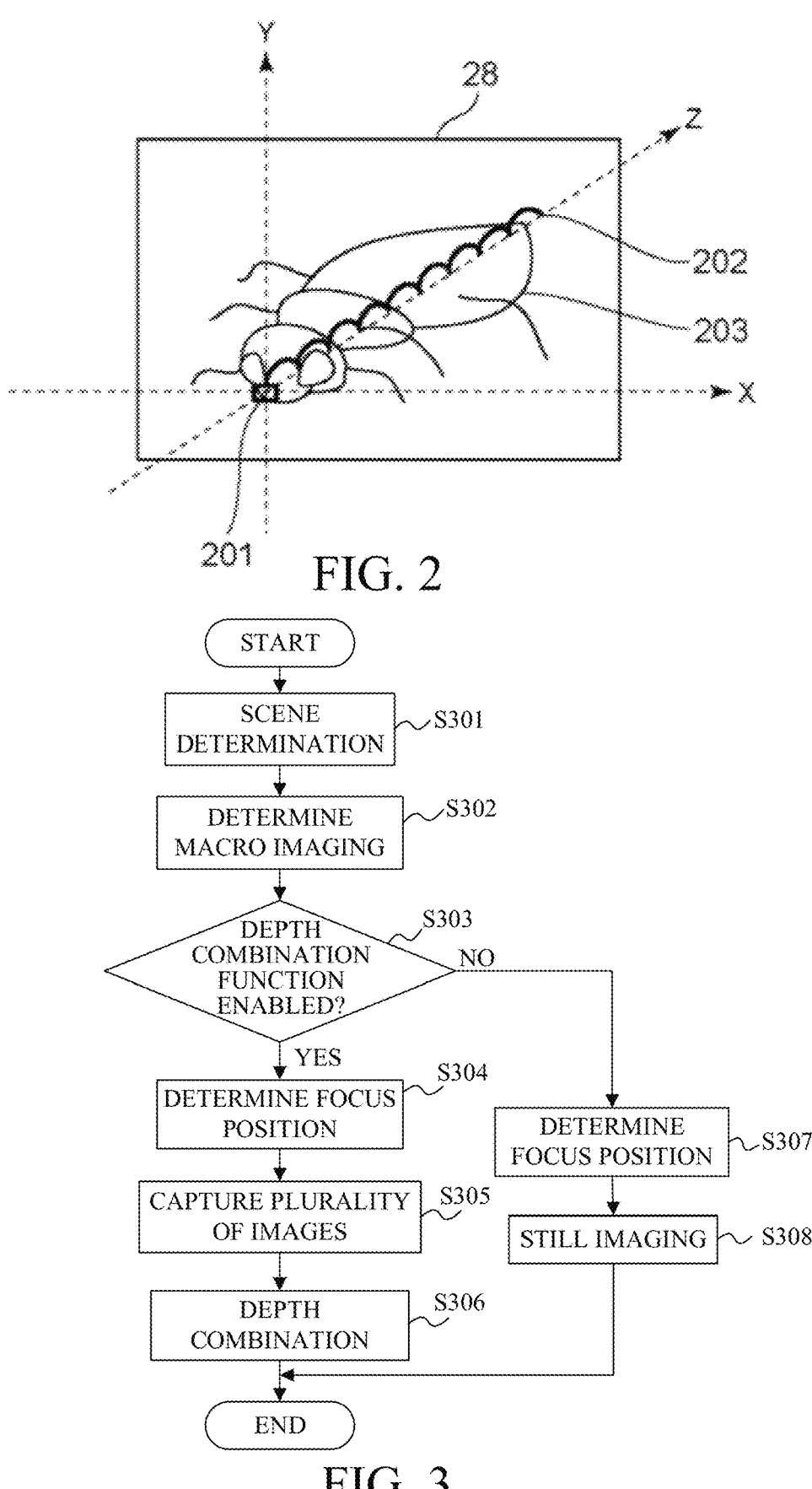
FIG. 2 explains a depth combined image in the first embodiment.
FIG. 3 is a flowchart illustrating depth combination processing according to the first embodiment.

Referring now to FIG. 2, a description will be given of the basic operation of depth combination processing in the image pickup apparatus 100. FIG. 2 explains a depth combined image in this embodiment, and illustrates an example of a display image displayed on the display unit 28 in a case where the depth combined image is live-viewed.

Position 201 is a focus position at the closest distance in the focus bracket imaging clearly indicated by the AF frame, position 202 is a focus position at infinity, and position 203 is an object (insect). What is displayed on the display unit 28 is an AF frame indicating the focus position 201 at the closest distance and the object 203. A user operates the operation unit 70 to designate a reference focus position on the image displayed on the display unit 28. Alternatively, a reference focus position may be automatically designated for the object detected by the AF evaluation value detector 23. In FIG. 2, assume that a location at the closest distance of the object 203 is designated as the reference focus position. Thereby, the system control unit 50 recognizes the designated reference focus position as the focus position 201 at the closest distance for focus bracket imaging and displays the AF frame at the focus position 201 at the closest distance.

Once the focus position 201 at the closest distance is determined, a focus position where focus bracket imaging ends, that is, the focus position 202 at infinity is determined in the Z-axis direction (depth direction) by a focus interval according to the focus step setting and the imaging times (the number of shots). In FIG. 2, assume that the entire object 203 falls within a focus range from the focus position 201 at the closest distance to the focus position 202 at infinity. The imaging times to generate one depth combined image is illustrated as ten times, and the depth combination unit 25 performs depth combination processing using ten images.

Referring now to FIG. 3, a description will be given of depth combination processing according to this embodiment. FIG. 3 is a flowchart illustrating depth combination processing in this embodiment.

First, in step S301, the system control unit 50 performs scene determination for a live-view image captured by the imaging unit 22. A specific method of scene determination will be described below.

Next, in step S302, the system control unit (acquiring unit) 50 acquires information (lens information) about lenses (optical systems) including the focus lens 103, and performs macro imaging determination based on the lens information. Macro imaging is an imaging method for providing an enlarged image of a small object by a close-up shot. Therefore, the imaging magnification tends to be large, the imaging distance tends to be short, and the depth of field tends to be shallow. In the case of macro imaging, the depth of field becomes shallow, and the in-focus area of the object to be imaged becomes smaller. Thus, this embodiment generates an image in which a wider range of the object is in focus by the depth combination, and thus previously determined whether or not macro imaging was performed. The lens information is acquired by the system control unit 50 communicating with the lens via an unillustrated lens communication unit. The lens information includes the ID of the lens, information about the imaging magnification (the numerical value of the imaging magnification itself, or specific information corresponding to the imaging magnification), and the like. In macro imaging determination, for example, in a case where the lens ID includes information about the ID of a specific close-up lens (specific lens information), or in a case where the imaging magnification calculated from the lens information is equal to or larger than a certain threshold, macro imaging is determined. The imaging magnification may be calculated by the system control unit 50 from the lens information, or may be directly acquired as the lens information.

Next, in step S303, the system control unit 50 determines whether to enable the depth combination function, using the scene determination result in step S301 and the macro imaging determination result in step S302. In a case where it is determined that the depth combination function is to be enabled, the flow proceeds to step S304. On the other hand, in a case where it is determined that the depth combination function is not enabled, the flow proceeds to step S307. In step S304, the system control unit 50 sets a plurality of focus positions. In step S307, the system control unit 50 sets one focus position.

As will be described in detail below, the system control unit 50 mainly finds the importance (level) of the main object and the background through image analysis in the scene determination processing (step S301) and determines whether to execute (enable) depth combination based on the obtained importance. Thereby, an image can be generated in which only the main object is in focus and a background landmark is in focus. However, it is difficult to determine, by image analysis alone, that the depth of field is shallow and focusing is difficult, such as macro imaging. Accordingly, in macro imaging determination processing (step S302), the system control unit 50 determines that focusing is difficult in imaging by the lens information analysis and performs depth combination based on the determination result. Thereby, proper depth control in a wider range of imaging scenes.

In step S304, the system control unit 50 determines the focus position and imaging number for depth combination. The system control unit 50 may also set a focus step according to an exposure control value and change the number of focus positions. This is processing that attempts to reduce processing time and a camera shake amount by reducing the number of shots, although the imaging time and camera shake amount increase as the exposure time increases. The system control unit 50 may determine whether to change the number of focus positions according to the attachment or detachment state of the tripod detected by the state detector 27.

Next, in step S305, the system control unit 50 controls driving of the focus lens 103 and the shutter 101, and thereby the imaging unit 22 sequentially captures images at a plurality of different focus positions set in step S304. Next, in step S306, the depth combination unit 25 generates an image (combined image) with an expanded depth of field using the plurality of images (captured images) captured in step S305. That is, the depth combination unit 25 combines a plurality of images having different focus positions and generates a combined image having a depth of field deeper than the plurality of images. At this time, the depth combination unit 25 extracts an in-focus area of each of the plurality of images and generates a combined image.

In step S308, the system control unit 50 controls driving of the focus lens 103 and shutter 101, so that the imaging unit 22 captures an image at the focus position set in step S307.

A detailed description will now be given of the depth combination processing in step S306. The depth combination processing according to this embodiment may be performed using a known technique, for example, as follows.

First, the image processing unit 24 aligns target images of depth combination. The image processing unit 24 sets a plurality of blocks in a reference image, which is one of the plurality of target images of depth combination. The image processing unit 24 may set the size of each block to be the same. Next, the image processing unit 24 sets a search range to a range wider than the blocks in the reference image in the alignment target image at the same position as each block in the reference image. Finally, the image processing unit 24 calculates, in each search range of the target image, a corresponding point that minimizes the sum of absolute differences (SAD) of luminance with the block of the reference image. The image processing unit 24 calculates a positional shift as a vector from the center of the block of the reference image and the corresponding point. In calculating the corresponding point, the image processing unit 241 may use, in addition to SAD, the sum of squared differences (SSD), normalized cross correlation (NCC), or the like.

Next, the image processing unit 24 calculates a transform coefficient from the positional shift amount between the reference image and the target image. The image processing unit 24 uses, for example, a projective transformation coefficient as the transform coefficient. However, the transform coefficient is not limited to the projective transform coefficient, and may use affine a transform coefficient or a simplified transform coefficient using only horizontal and vertical shifts.

For example, the image processing unit 24 can perform the transformation using the following equation (1).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \tag{1}$$

In equation 1, (x', y') indicates the post-transformation coordinates, and (x, y) indicates the pre-transformation coordinates. Matrix A shows the transformation coefficient.

After the alignment, the depth combination unit 25 calculates a contrast value for a post-alignment image. A method for calculating the contrast value, for example, first calculates luminance Y using the following equation (2) and color signals Sr, Sg, and Sb of each pixel.

$$Y = 0.299Sr + 0.587Sg + 0.114Sb \tag{2}$$

Next, the contrast value I is calculated using a Sobel filter on a matrix L of luminance Y of 3×3 pixels, as shown in the following equations (3) to (5).

$$I_h = \begin{pmatrix} -1 & 0 & 1 \\ -2 & 0 & 2 \\ -1 & 0 & 1 \end{pmatrix} \cdot L \tag{3}$$

$$I_v = \begin{pmatrix} -1 & -2 & -1 \\ 0 & 0 & 0 \\ 1 & 2 & 1 \end{pmatrix} \cdot L \tag{4}$$

$$I = \sqrt{I_h^2 + I_v^2} \tag{5}$$

The above contrast value calculation method is a mere example, and for example, can use an edge detection filter such as a Laplacian filter or a bandpass filter that passes a predetermined band.

Next, the depth combination unit 25 generates a combination map. As a method for generating the combination map, the depth combination unit 25 compares the contrast values of pixels at the same position in respective images, and calculates a composition ratio according to the magnitude of the contrast value.

An example of a specific calculation method will be illustrated below. The depth combination unit 25 generates a combination map Am(x, y) using contrast value Cm(x, y). m represents the m-th image among a plurality of images with different focus positions, x represents a horizontal coordinate of the image, and y represents a vertical coordinate of the image. As a method for generating the combination map, the depth combination unit 25 compares the contrast values of pixels at the same position in the respective images, and calculates a combination ratio according to the magnitude of the contrast value. More specifically, a combination ratio of 100% is given to the pixel with the largest contrast value among images at the same position, and a combination ratio of 0% is given to another pixel at the same position. In other words, the following equation (6) is established.

$$A_m(x, y) = \max_{k=1} C_k(x, y) \qquad (6)$$

However, the combination ratio is properly adjusted so that the border does not become unnatural. As a result, the combination ratio of the combination map in one image is not binary values of 0% and 100%, but is one that continuously changes.

The depth combination unit 257 generates an all-in-focus image O(x, y) by combining the captured images according to the calculated combination map. An image is generated as expressed by the following equation (7):

$$O(x, y) = \sum_{k=1}^{M} B_k(x, y) \times I_k(x, y) \qquad (7)$$

where Im(x, y) is a captured original image.

The example of the depth combination processing in step S306 has been thus described.

Figure 4:
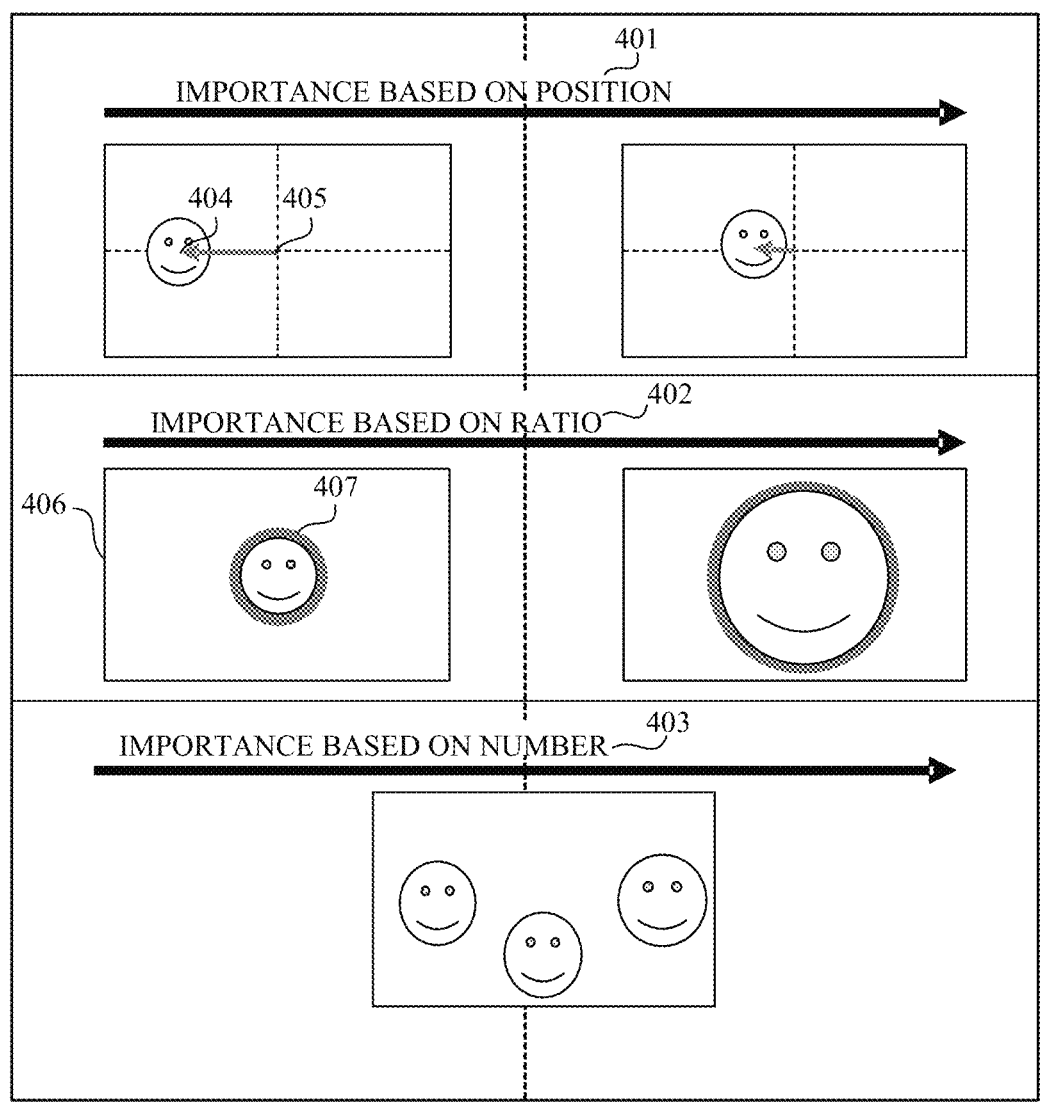
FIG. 4 explains an example of main object detection according to the first embodiment.

Referring now to FIG. 4, a description will be given of the scene determination in step S301. The example according to this embodiment detects a face as a main object from a live-view image and performs scene determination based on the position, size, number, etc. of the face. FIG. 4 explains an example of main object detection according to this embodiment. First, the AF evaluation value detector 23 detects a face (main object). Next, the system control unit 50 calculates importance (level) 401 based on the position of the face detected by the AF evaluation value detector 23, importance 402 based on a ratio of the face in the field of view, and importance 403 based on the number of faces. More specifically, the system control unit 50 may set the importance 401 to a value that is negatively correlated to a distance between a face center position 404 and a center 405 of the angle of view. The system control unit 50 may set the importance 402 to a value that is positively correlated to the ratio of the face 407 of the angle of view 406. The system control unit 50 may set the importance 403 to a value that is positively or negatively correlated with the number of faces.

In a case where the importance of the main object is higher than a predetermined threshold, the system control unit 50 determines that depth combination is to be performed. In a case where the system control unit 50 determines that depth combination is to be performed, it determines that the in-focus position is placed on the main object (face) to focus on the main object and generate a combined image with a blurred background. On the other hand, in a case where the system control unit 50 determines that depth combination is not to be performed, it captures only one image having a deep depth of field that includes the background.

In a case where the face of the main object is not detected, the system control unit 50 refers to the macro imaging determination result in step S302, and if having determined macro imaging, determines that depth combination is to be performed. As mentioned above, in the case of macro imaging, the depth of field tends to be shallow, and the area in which the object to be imaged is in focus tends to be small. Even in this case, depth combination can generate a combined image in which a wider range of the object is in focus. Although the above description has assumed that the main object is a face, the main object is not limited to this example.

In step S301, the system control unit 50 calculates an area other than the main object detected by the AF evaluation value detector 23 as a background area. FIGS. 5A and 5B explain an example of background area detection according to this embodiment. FIG. 5A illustrates an outdoor image 501. FIG. 5B illustrates an indoor image 503.

The system control unit 50 acquires an image in which the background region is in focus, and calculates the importance of the background area. In a case where it is determined that the importance of the background is lower than a predetermined threshold, the system control unit 50 determines that depth combination is to be performed (enabled). For example, in an image 501 of FIG. 5A, the system control unit 50 increases the importance of the background in a case where the AF evaluation value detector 23 detects an object 502 within the background area. For each of the image 501 in FIG. 5A and an image 503 in FIG. 5B, the system control unit 50 determines whether or not it is outdoors according to the calculation results of the exposure control value and focus detecting control value obtained by the image processing unit 24. For outdoor images, the importance of the background may be increased. In the case of the outdoor image, especially in a case where a landmark is present in the background, a single image may be captured with a deep depth of field in order to combine the image with the landmark as well. In the case of outdoor imaging, increasing the importance of the background is processing that assumes that a landmark exists in the background of the outdoor image.

The system control unit 50 may detect both the main object and the background, and determine whether to perform depth combination based on the importance of both of them. In a case where the face of the main object is not detected, this embodiment determines whether to perform depth combination based on the macro imaging determination result, but this embodiment is not limited to this example. For example, even if a face is detected, this embodiment may determine whether to perform depth combination based on the macro imaging determination result. Only macro imaging determination may be performed without performing scene determination, and it may be determined whether or not to perform depth combination based on the macro imaging determination result.

This embodiment can automatically determine whether to perform depth combination based on the imaging magnification obtained from the lens information.

Second Embodiment

Figure 6:
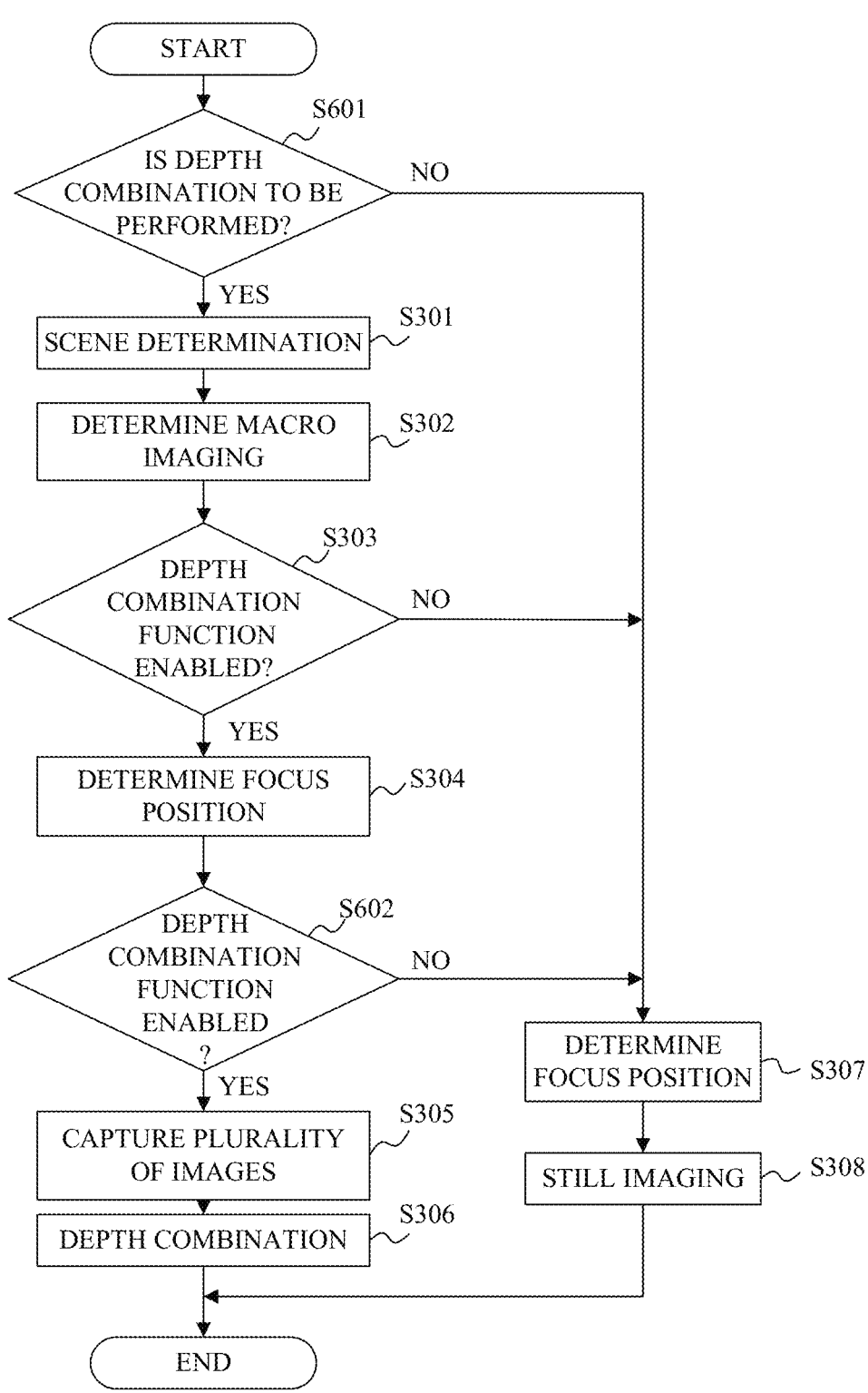
FIG. 6 is a flowchart illustrating depth combination processing according to a second embodiment.

Referring now to FIG. 6, a description will be given of a second embodiment. This embodiment is different from the first embodiment in that whether depth combination is to be performed is determined before and after scene determination. This embodiment will omit a description of common matters to the first embodiment. FIG. 6 is a flowchart illustrating depth combination processing according to this embodiment. FIG. 6 is different from FIG. 3 in that steps S601 and S602 for determining whether to perform depth combination are inserted before and after the scene determination in step S301, respectively.

First, in step S601, the system control unit 50 determines whether to perform depth combination based on the live-view image before scene determination or the settings of the image pickup apparatus 100. In a case where it is determined that depth combination is not to be performed, the flow proceeds to step S307, and the system control unit 50 controls the imaging unit 22 to capture only one image. In step S601, for example, in a case where the motion detector 26 detects a moving object, the system control unit 50 determines that depth combination is not to be performed. This is to prevent the quality of the combined image from deteriorating due to the combination of areas with movement. In step S601, for example, the system control unit 50 may determine whether or not a selfie mode is set which captures an image of the user, according to the state of the image pickup apparatus 100 (camera state) detected by the state detector 27. An example of the camera state is a state in which the monitor faces toward the lens. In a case where it is a variable-angle monitor, it is a state in which the monitor is opened and rotated by 180 degrees. In a case where it is a tilt monitor, it is a state in which the monitor is moved in any direction so that the monitor faces toward the lens. In an image pickup apparatus such as an in-camera in a smartphone, where the monitor and lens directions match, whether to perform depth combination can be automatically determined. This is because in a selfie mode, the main object and the background are far apart in the optical axis direction and are unsuitable for depth combination.

A description will now be given of the determination to perform depth combination in step S602. The system control unit 50 enables the depth combination function in step S303, determines the focus position in step S304, and then determines whether to perform depth combination in step S602. That is, unlike step S601, at the time of step S602, settings for depth combination (for example, the imaging number, focus step, etc.) have already been completed.

In step S602, the system control unit 50 determines whether to perform depth combination based on the settings for depth combination determined in step S304. For example, in a case where the determined number of captured images is larger than a predetermined threshold, the system control unit 50 determines that depth combination is not to be performed. This is to prevent an increase in processing time due to an increase in the number of captured images. In this case, in the imaging in step S308, the diaphragm (aperture stop) may be adjusted so as to capture a single image that has a depth of field corresponding to that of the combined in a case where depth combination is to be performed.

In step S602, the system control unit 50 determines that depth combination is not to be performed in a case where the system control unit 50 predicts the depth of field of the depth combined image from the determined focus position and the depth of field of a single image, and the depth of field of the depth of the depth combined image is less than a predetermined threshold. This is because in a case where the depth of field of the combined image is shallow, there is little merit in performing depth combination. Here, the system control unit 50 may simply predict the depth of field of the depth combined image from the focus positions at both ends of the determined focus position. In this embodiment, only one of step S601 and step S602 may be executed.

Before and after scene determination and macro imaging determination, this embodiment can prevent depth combination, if it is determined that there is no need to perform depth combination based on the camera state, moving object detection, determined focus position, etc.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide an image processing apparatus that can perform settings about depth combination without user operation.

This application claims the benefit of Japanese Patent Application No. 2022-197082, filed on Dec. 9, 2022, which is hereby incorporated by reference herein in its entirety.

What is claimed is:

1. An image processing apparatus comprising:
a memory storing instructions; and
a processor configured to execute the instructions to:
detect a main object,
determine whether or not macro imaging, and
combine a plurality of images captured at different focus positions to generate a combined image having a depth of field deeper than that of each of the plurality of images, in a case where the main object is detected, or in a case where macro imaging without detecting the main object.

2. The image processing apparatus according to claim 1, wherein the processor is configured to acquire lens information, and determine whether or not macro imaging based on the lens information.

3. The image processing apparatus according to claim 2, wherein the lens information includes an imaging magnification.

4. The image processing apparatus according to claim 2, wherein the lens information includes lens ID which identifies the lens.

5. The image processing apparatus according to claim 2, wherein the processor is configured to calculate an imaging magnification using the lens information.

6. The image processing apparatus according to claim 5, wherein in a case where the imaging magnification is equal to or higher than a certain threshold, the processor is configured to determine whether or not macro imaging.

7. An image pickup apparatus comprising:
the image processing apparatus according to claim 1; and
an imaging unit configured to acquire the plurality of images.

8. The image processing apparatus according to claim 1, wherein in a case where the processor has determined that there is a moving object, the processor does not combine the plurality of images.

9. The image processing apparatus according to claim 8, wherein the processor is configured to determine that there is the moving object before determining the main object.

10. An image processing method comprising the steps of:
detecting a main object,
determining whether or not macro imaging, and
combining a plurality of images captured at different focus positions to generate a combined image having a depth of field deeper than that of each of the plurality of images, in a case where the main object is detected, or in a case where macro imaging without detecting the main object.

11. A non-transitory computer-readable storage medium storing a program for causing a computer to execute the image processing method according to claim 10.

12. The image processing apparatus according to claim 1, wherein the processor is configured to extract an in-focus area of each of the plurality of images and to generate the combined image.

13. The image processing apparatus according to claim 1, wherein the processor is configured to determine whether to combine the plurality of images based on whether an evaluation value calculated for the main object is higher than a predetermined threshold.

14. The image processing apparatus according to claim 13, wherein the evaluation value is calculated based on a position of the main object in the image.

15. The image processing apparatus according to claim 13, wherein the evaluation value is calculated based on a size of the main object in the image.

16. The image processing apparatus according to claim 13, wherein the evaluation value is calculated based on the number of the main object in the image.

17. The image processing apparatus according to claim 1, wherein the main object is an object on which in-focus position is placed to generate the combined image.

18. The image processing apparatus according to claim 1, wherein the processor is configured to detect the main object to determine the scene for at least one of the plurality of images.

19. The image processing apparatus according to claim 1, wherein the processor is configured to combine the plurality of images in the case the processor has detected the main object, regardless of whether or not macro imaging.

20. An image capturing apparatus comprising:
an image capturing unit configured to capture an image of an object;
at least one processor; and
a memory coupled to the at least one processor, the memory having instructions that cause the processor to function as:
a detecting unit configured to detect a main object,
a determining unit configured to determine whether or not macro imaging, and
a controlling unit configured to control the image capturing unit to capture a plurality of images at different focus positions based on a detection result detected by the detecting unit and a determination result determined by the determining unit.

21. The image capturing apparatus according to 20, wherein the image capturing unit configured to capture the plurality of images
in a case where the processor has detected the main object or
in a case where the processor has not detected the main object and in a case of macro imaging.

* * * * *